(12) United States Patent
Chai

(10) Patent No.: US 12,184,071 B2
(45) Date of Patent: Dec. 31, 2024

(54) ACTIVE RECTIFIER WITH PHASE LOCKED VARYING SWITCH FREQUENCIES

(71) Applicant: Hamilton Sundstrand Corporation, Charlotte, NC (US)

(72) Inventor: Huazhen H. Chai, Discovery Bay, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/326,361

(22) Filed: May 31, 2023

(65) Prior Publication Data

US 2024/0405552 A1     Dec. 5, 2024

(51) Int. Cl.
*H02J 3/01* (2006.01)
*H02J 3/38* (2006.01)

(52) U.S. Cl.
CPC .............. *H02J 3/01* (2013.01); *H02J 3/381* (2013.01); *H02J 2310/44* (2020.01)

(58) Field of Classification Search
CPC ........................................................ H02J 3/01
See application file for complete search history.

(56) References Cited

U.S. PATENT DOCUMENTS

| | | | |
|---|---|---|---|
| 7,190,143 B2 | 3/2007 | Wei et al. | |
| 7,308,614 B2 | 12/2007 | Kojori | |
| 8,305,051 B2 | 11/2012 | Phadke et al. | |
| 9,728,962 B2 | 8/2017 | Hasler et al. | |
| 11,336,206 B2 | 5/2022 | Cui et al. | |
| 11,606,025 B2 | 3/2023 | Blane | |
| 2013/0088903 A1 | 4/2013 | Sagona et al. | |
| 2017/0085195 A1* | 3/2017 | Steimer | H02P 6/14 |

OTHER PUBLICATIONS

Benzaquen et al. "On the Dynamic Performance of Variable-Frequency AC-DC Converters", IEEE Transactions on Transportation Electrification, vol. 6, No. 2, Jun. 2020, 10 pages.
European Search Report corresponding to EP Application No. 24178912.2; Mailing Date, Oct. 18, 2024, 32 pages.
Wang, "Reduce Beat and Harmonics in Grid-Connected Three-Level Voltage-Source Converters With Low-Stitching Frequencies", IEEE Transactions on Industry Application, vol. 43, No. 5, Sep./Oct. 2007, 11 pages.

* cited by examiner

*Primary Examiner* — Daniel Kessie
(74) *Attorney, Agent, or Firm* — CANTOR COLBURN LLP

(57) ABSTRACT

A power distribution system includes a variable frequency alternating current (AC) generator, an active rectifier electrically connected to the variable frequency AC generator such that AC power output from the variable frequency AC generator is rectified by the active rectifier, and a switching controller configured to detect a fundamental frequency of the AC power output and lock an active switch rate of the active rectifier to an integer multiple of the fundamental frequency.

20 Claims, 5 Drawing Sheets

ACTIVE RECTIFIER WITH PHASE LOCKED VARYING SWITCH FREQUENCIES

INTRODUCTION

The subject disclosure relates to three phase rectification in aerospace electronics, and more specifically to a phase locked active rectifier for use in an aircraft.

Modern systems for generating electricity typically utilize rotation, such as excess rotation from a turbine shaft, an industrial machine, and the like, to generate alternating current (AC) power using a generator. This power can be provided from the generator to other electrically powered systems as operational power. When the electrically powered systems require direct current (DC) based energy, rectifiers are used to convert the AC power to DC power.

One type of rectification uses an active rectifier is to improve rectification by using actively controlled switches, such as power MOSFETs or power bipolar junction transistors (BJT) to actively control current flow through a circuit and convert the current from AC to DC. Active rectification such as this has been used in industrial applications where the fundamental frequency output by the generator is fixed at a constant frequency of about 50 Hz or 60 Hz. Active rectifiers with a fixed frequency typically perform well for such applications because the low fundamental frequency makes it easier to have a moderate switching frequency that is substantially higher than the fundamental frequency.

In contrast, due to the particular machines generating the rotation, aerospace and similar applications utilize generators that operate at a high, variable fundamental frequency can be 16 times higher than the typical commercial power frequencies. Existing active rectifiers for high, variable, fundamental frequencies use harmonic filtering that relies on filter components that have a high weight and size and a low power rating, such that switching at a higher frequency is more desirable.

As can be appreciated, in Aerospace applications weight and size come at a large penalty, and it is desirable to reduce the weight and size of components designed for use within aerospace applications.

SUMMARY

In one exemplary embodiment a power distribution system includes: a variable frequency alternating current (AC) generator; an active rectifier electrically connected to the variable frequency AC generator such that AC power output from the variable frequency AC generator is rectified by the active rectifier; and a switching controller configured to detect a fundamental frequency of the AC power output and lock an active switch rate of the active rectifier to an integer multiple of the fundamental frequency.

In addition to one or more of the features described herein the variable frequency AC generator is a gas turbine engine generator.

In addition to one or more of the features described herein the fundamental frequency is in the range of 360 Hz to 800 Hz.

In addition to one or more of the features described herein the active switching rate of the active rectifier is one of 15 times the fundamental frequency, 21 times the fundamental frequency, and 27 times the fundamental frequency.

In addition to one or more of the features described herein the active switching rate of the active rectifier is 21 times the fundamental frequency.

In addition to one or more of the features described herein the active switching rate of the active rectifier is 15 times the fundamental frequency.

In addition to one or more of the features described herein the active switching rate of the active rectifier is 27 times the fundamental frequency.

In addition to one or more of the features described herein the switching controller is a dedicated active rectifier controller.

In addition to one or more of the features described herein the switching controller is a component of a general purpose aircraft controller.

In another exemplary embodiment a method for reducing attenuation requirements in an active rectifier includes: identifying a fundamental frequency of an alternating current (AC) power received by the active rectifier and setting a switching rate to of the active rectifier to an odd number integer multiple of the fundamental frequency using a controller.

In addition to one or more of the features described herein the switching rate of the active rectifier is one of 15 times the fundamental frequency, 21 times the fundamental frequency, and 27 times the fundamental frequency.

In addition to one or more of the features described herein the switching rate of the active rectifier is 21 times the fundamental frequency.

In addition to one or more of the features described herein the switching rate of the active rectifier is 15 times the fundamental frequency.

In addition to one or more of the features described herein the switching rate of the active rectifier is 27 times the fundamental frequency.

In addition to one or more of the features described herein the AC power is generated by a variable frequency generator and wherein the fundamental frequency of the AC power varies across operation of the variable frequency generator.

In addition to one or more of the features described herein the fundamental frequency of the AC power varies across the range of 360 Hz to 800 Hz.

In addition to one or more of the features described herein the variable frequency generator is a gas turbine engine generator.

In yet another exemplary embodiment an aircraft power distribution system comprising: a gas turbine engine including a variable frequency generator; an active rectifier electrically connected to the variable frequency generator and configured to rectify power received from the variable frequency generator; and a switching controller coupled to the active rectifier and configured to set a switching rate of the active rectifier to a whole number integer multiple of a fundamental frequency of the power.

In addition to one or more of the features described herein the fundamental frequency of the power varies in the range of 360 Hz to 800 Hz, and wherein the whole number integer is one of 15, 21 and 27.

In addition to one or more of the features described herein the fundamental frequency varies across a single operation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
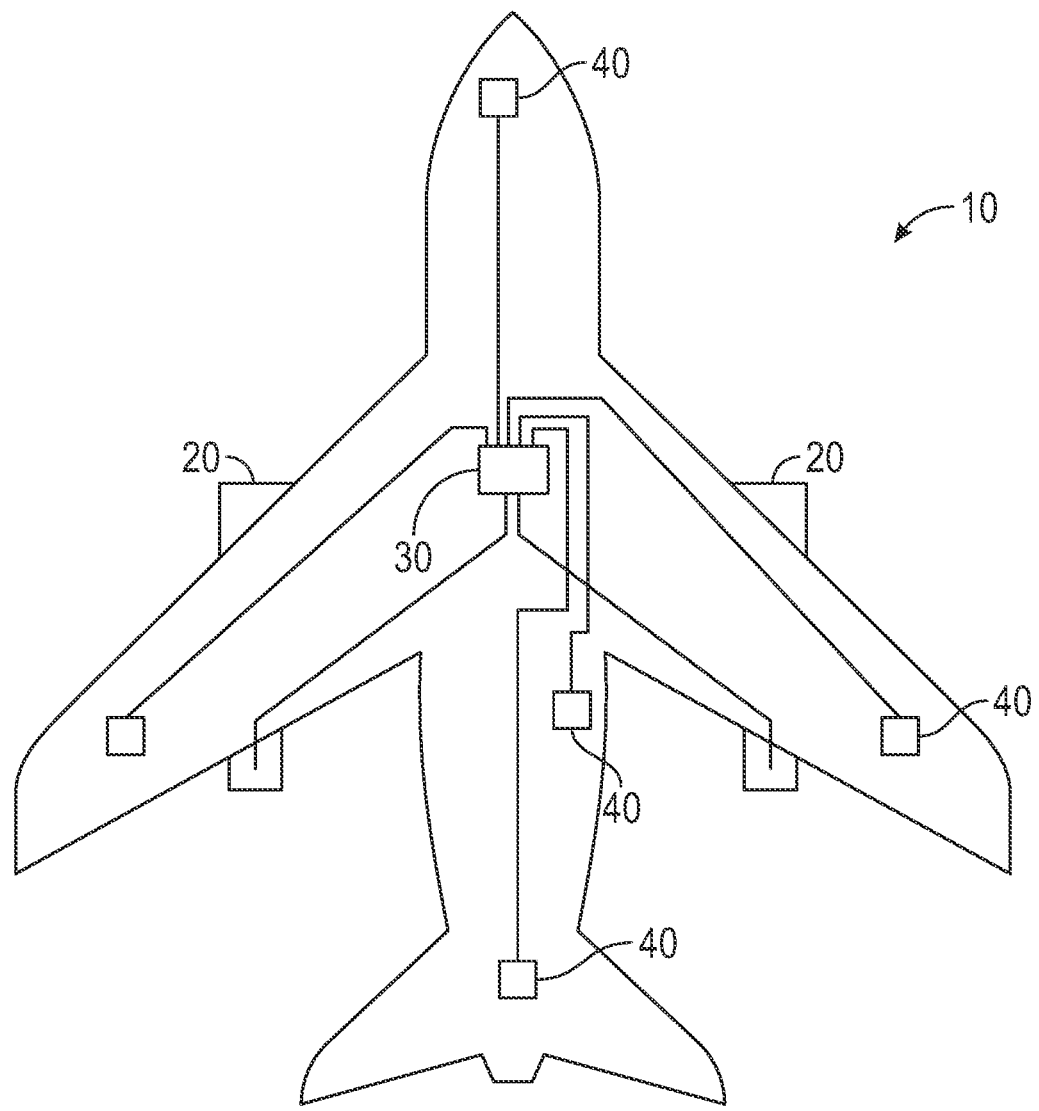
FIG. 1 is an example aircraft including a gas turbine engine, a generator and an electrical power system.

FIG. 1 illustrates an exemplary aircraft 10, such as a passenger aircraft or a cargo aircraft. The aircraft 10 includes gas turbine engines 20, each of which includes an electric generator configured to convert excess rotation from the gas turbine engine 20 into electric power. The generators generate AC power and provide the AC power to a power distribution system 30. The power distribution system 30 includes an active rectifier, that converts the AC power to DC power. Once converted, the power distribution system provides the power to multiple electrical systems 40 distributed throughout the aircraft.

In a practical application the power distribution system 30 can include a dedicated power systems controller for controlling power distribution throughout the aircraft. In other examples, a general aircraft controller can directly or indirectly control the power distribution system 30.

Figure 2:
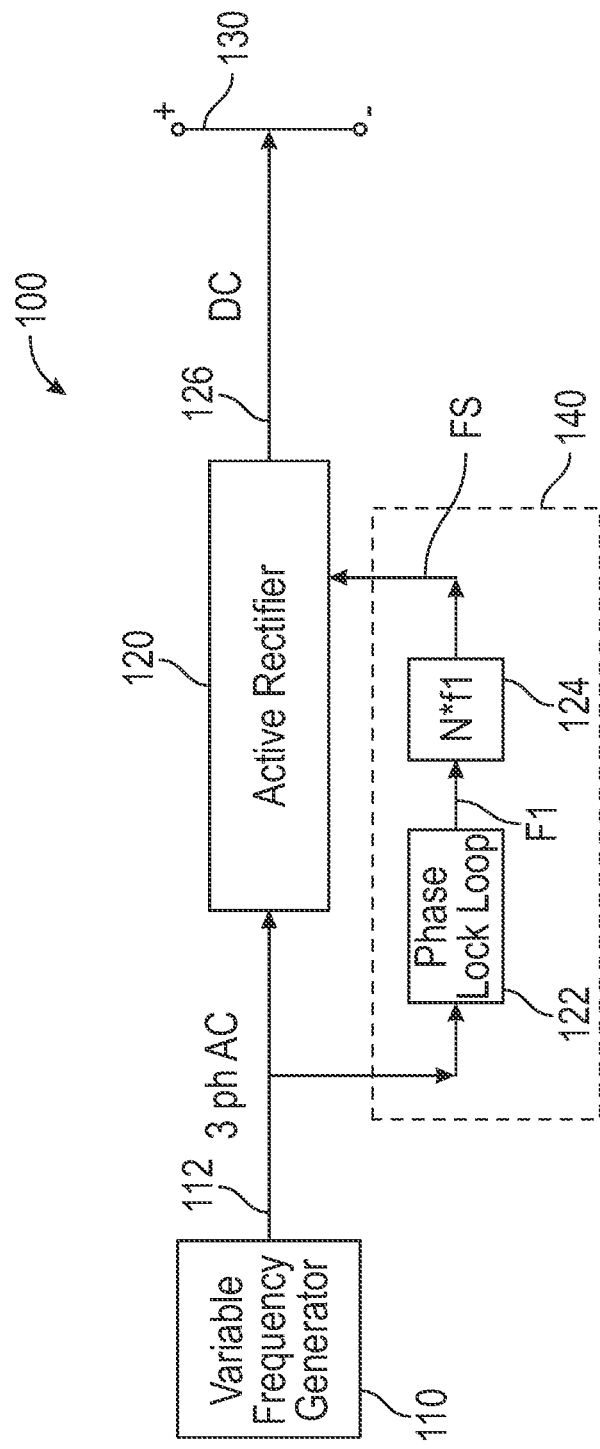
FIG. 2 is an example AC to DC rectification power system for the aircraft of FIG. 1.

With continued reference to the aircraft of FIG. 1, FIG. 2 illustrates a power system 100 including a variable frequency generator 110 configured to convert mechanical rotation, such as rotation of a gas turbine engine shaft into 3-phase electric power. Due to the varying rotational speed of the source of rotation, the output power from the generator 110 has a varying electrical frequency. In one example, the frequency can vary from 360 Hz to 800 Hz. An output 112 of the variable frequency generator 110 is provided to an active rectifier 120. The active rectifier 120 uses actively controlled switching of electrical switches arranged in any known rectifier topology to generate a DC power output 126. The DC power output 126 is provided to a power distribution bus 130 and distributed throughout a system, such as the aircraft 10. The switching speed of the active rectifier 120 is controlled via a controller 140.

The controller 140 includes a phase lock loop 122 that identifies the fundamental frequency of the 3 phase AC current output 112 of the variable frequency generator 110 and provides the identified frequency F1 to a frequency multiplier 124. The frequency multiplier 124 multiplies the identified frequency F1 by a constant multiplication factor N to determine the switching frequency FS. The switching frequency is then output to the active rectifier 120 and controls the switching speed. It should be appreciated that some, or all, of the operations within the controller 140 may be performed by an exterior general controller, a switching controller specifically dedicated to the active rectifier 120, and/or a combination of processors and memories distributed throughout a control system of the aircraft. Further, it should be appreciated that the system 100 is illustrated in a highly schematic fashion for illustrative and explanatory purposes, and the illustration should not be interpreted as conveying actual dimensions, physical layouts, or physical constructions. The implementation of the phase lock loop 122 and the multiplier 124 by the controller 140 ensures that the switching frequency of the active rectifier 120 is locked to (cannot vary from) the Nth multiple of the frequency of the output 112, and the value of the constant N is selected to eliminate or substantially reduce attenuation requirements of the output power.

With continued reference to FIG. 1 and FIG. 2, it is appreciated that within aerospace power systems and similar systems, active rectification can include substantial drawbacks due to the varying AC power frequency and strict current harmonic limits of some, or all, of the electrical systems 40 within the power distribution system.

The aerospace harmonic specification is similar to the spectrum of a conventional 12-pulse or 18-pulse passive rectifier, with extremely tight limits on even and triplen harmonics. However, the harmonic spectrum of the active rectifier is very different from that of passive rectifiers. The sideband harmonics from PWM modulation can easily line up with an even or triplen frequency that would need excessive filtering. The harmonic spectrum of the active rectifier 120 includes multiple common mode and differential mode harmonic currents (referred to alternately as harmonics), at distinct frequencies, and the presence and magnitude of the harmonics are dependent on both the fundamental frequency of the generator output current 112 and the switching frequency FS of the active rectifier 120. Aerospace specifications set limits for maximum current magnitudes in order to prevent interference with proper operations of aircraft systems. The individual harmonic limits of the power distribution system 30 are set very low for even (two times multiplier) and tripplen (three times multiplier) harmonics within the output current. These limits do not raise a problem with the harmonic spectrum created in non-aerospace applications, however the harmonic spectrum provided by the active rectification of the system described herein can exceed the limits and interfere with operation of the electronics 40 in an aircraft, absent attenuation.

During operation, the active rectifier 120 output includes both common mode and differential mode harmonics. It is easier and cheaper to attenuate common mode harmonics than differential mode harmonics. As a result, filters for the common mode harmonics can be used without incurring substantial cost and weight penalties, and other attenuation modes are considered for differential mode harmonics.

Figure 3:
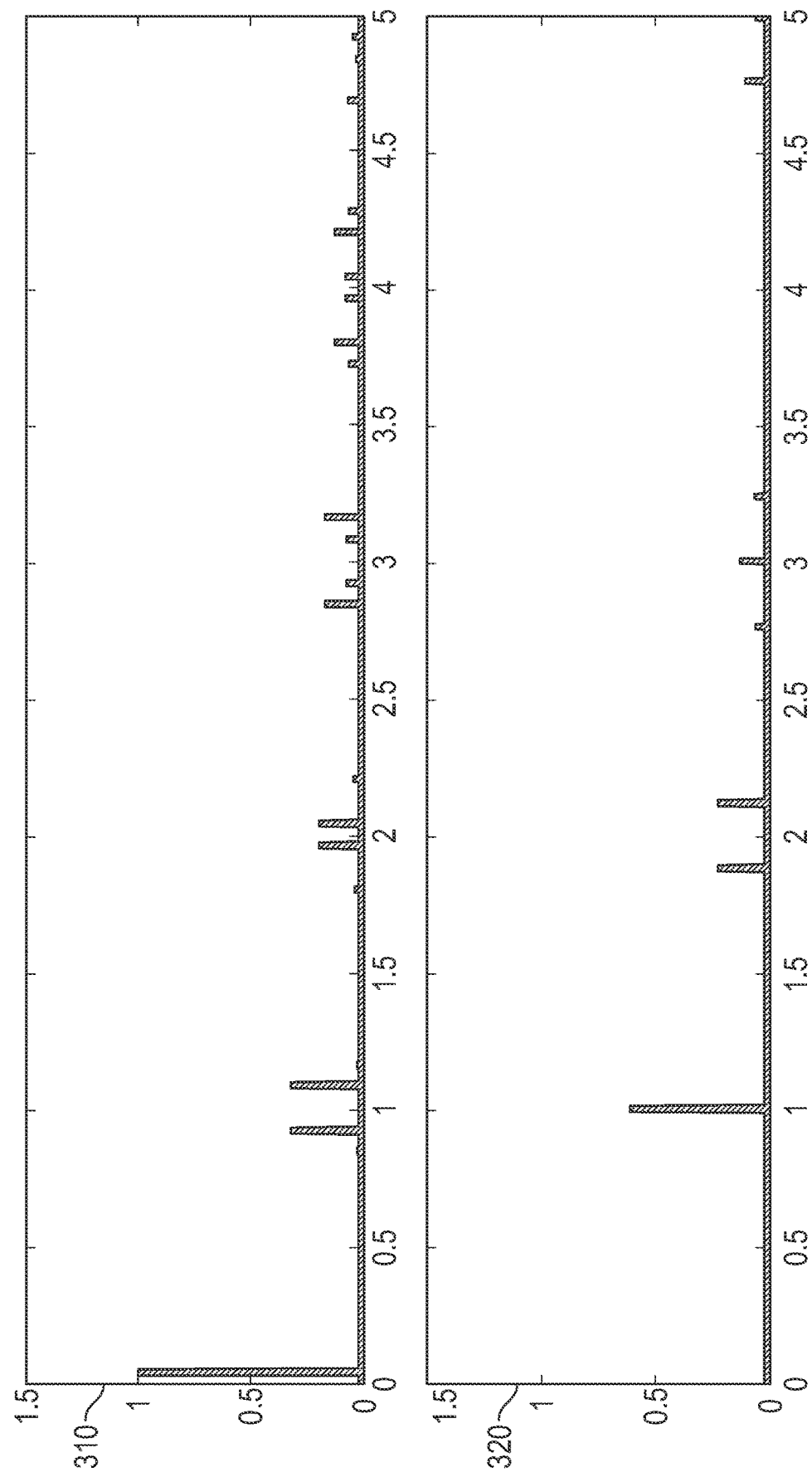
FIG. 3 is a plot of common mode and differential mode components at a fundamental frequency.

Harmonics created by the switching frequency of an active rectifier that are in positions of the even or triplen harmonics require attenuation systems (e.g., filters) to reduce the magnitude of the harmonics is below the limits imposed by aerospace specifications. Existing filters capable of providing this attenuation carry a high size, weight and cost requirement to reduce the undesirable harmonics below the specified limits. FIG. 3 illustrates a frequency spectrum of both the differential mode frequency harmonics 310 and the common mode frequency harmonics 320.

Figure 4:
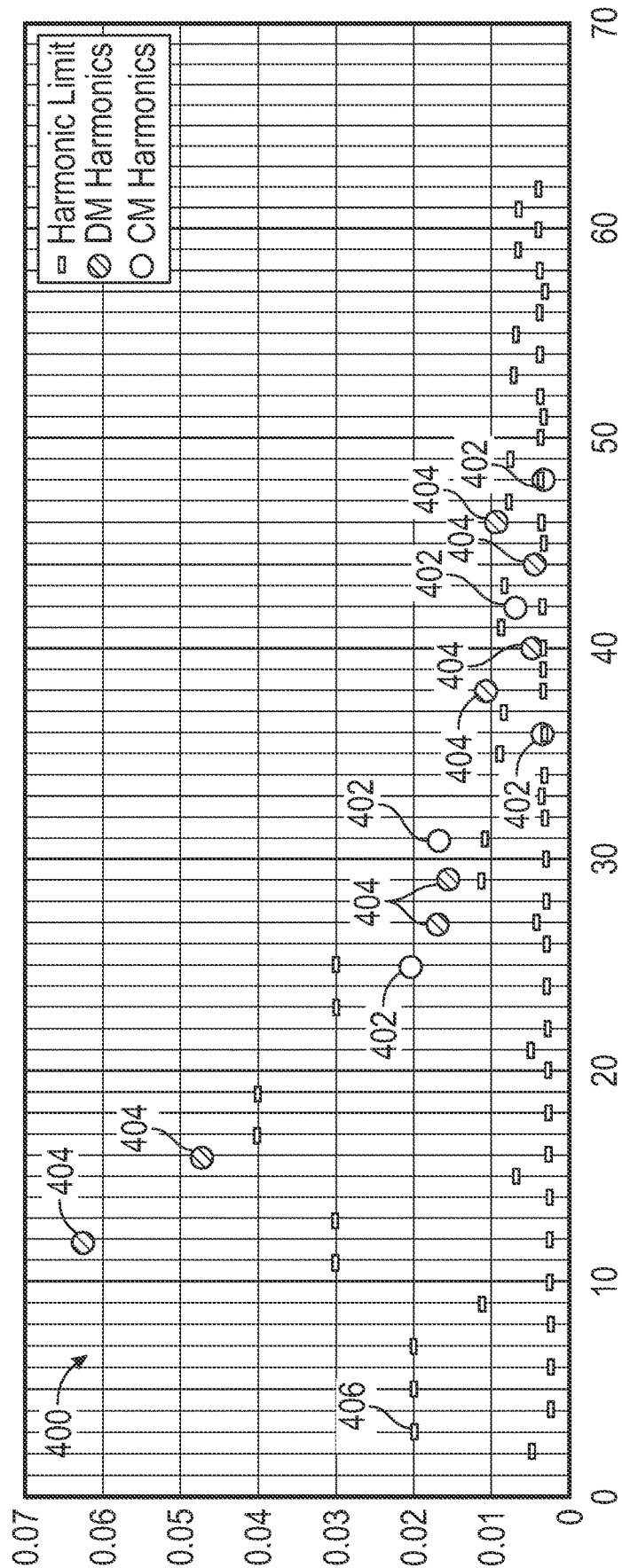
FIG. 4 is a plot of harmonic magnitudes at an arbitrary fundamental frequency multiplier.

Similarly, FIG. 4 provides a harmonic plot 400 that illustrates both the common mode harmonics 402 and the differential mode harmonics 404 on a limit plot at an arbitrarily chosen multiple of the fundamental frequency (e.g., 14 times the fundamental frequency). At each plotted frequency, a limit bar 406 is included on the plot 400 defining the upper bound of acceptable current at that frequency. When either a common mode harmonic 402 or a differential mode harmonic 404 is above the limit 406 at a given frequency, further attenuation (e.g., filtering) is required to reduce the common mode harmonic or the differential mode harmonic 404 below the limit 406.

At the illustrated 14 times the fundamental frequency, multiple harmonic currents 402, 404 exceed the limits 406. In the example of FIG. 4, the most prominent component is the 12th harmonic, which is 25 times higher than the permissible limit. A filter with an attenuation factor of more than 25 at the 12th harmonic would be required to meet the limits 406.

If the switching frequency is increased to 15 times the fundamental frequency (e.g. N in the multiplier 124 is set at 15), the most prominent harmonic is present at the 13th harmonic and the magnitude of attenuation required to reduce the harmonic below the limit is only two, which is substantially lower than the attenuation requirement of a 25 times reduction at a 14 times multiplier. Increasing the multiplier again to 16 results in a prominent harmonic current at the 14th harmonic, which requires a 22 times attenuation. As such, simply increasing the multiplier N does not always result in a corresponding reduction in attenuation requirements. Furthermore, it should be appreciated that while a general trend occurs as the multiplier N is increased, outliers from the trend exist.

Figure 5:
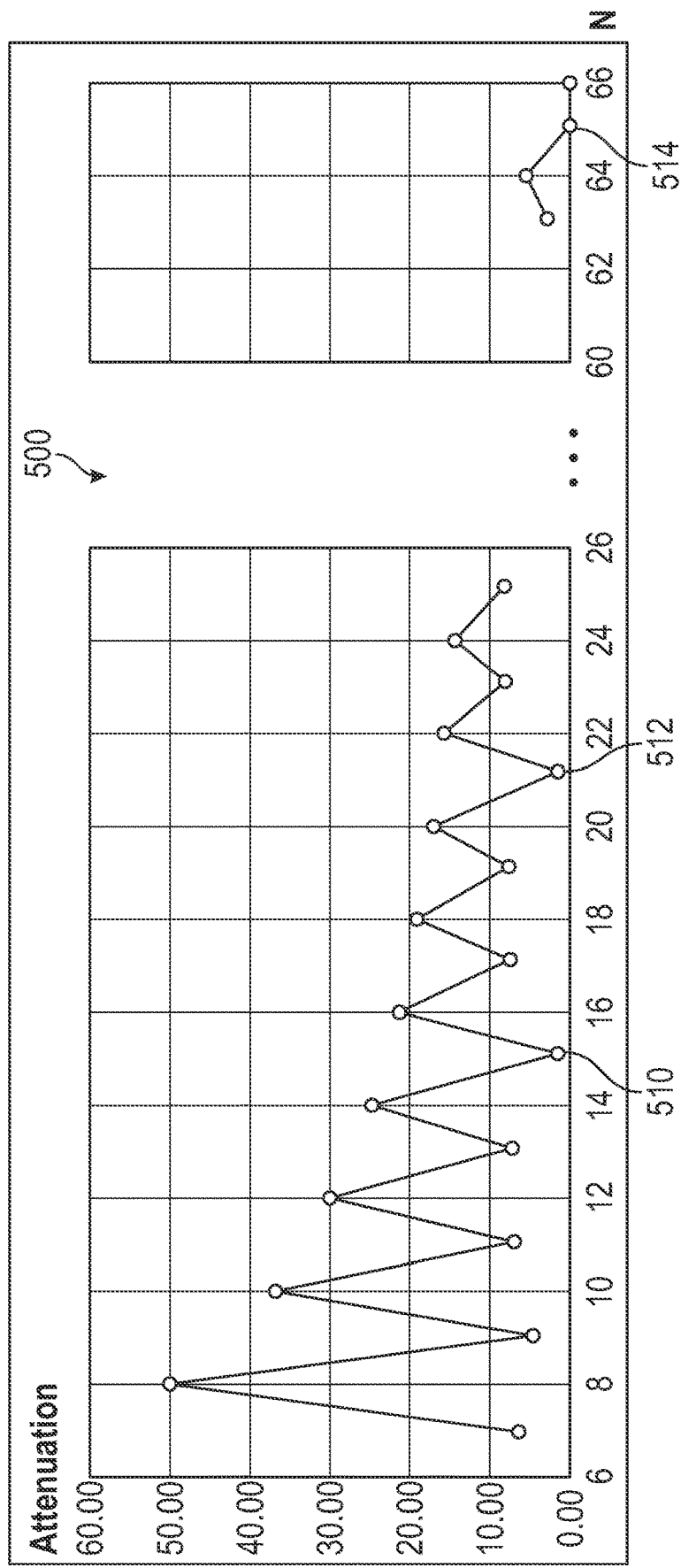
FIG. 5 is a plot of attenuation required to reduce the most prominent harmonic at a given switching rate multiplier.

As such, the filtering requirements are particularly sensitive to the selection of the switching frequency multiplier. FIG. 5 illustrates a plot 500 of the attenuation (vertical axis) required to reduce the most prominent harmonic at a given fundamental frequency multiplier N (horizontal axis). As can be seen, even multipliers (8, 10, 12, 14, etc.) result in a substantially higher attenuation requirement than the odd multipliers (7, 9, 11, 13, etc.). Certain multipliers result in substantially lower attenuation requirements than the trend indicates and are unpredictable outliers. Specifically, at a 15 times multiplication 510 and a 21 times multiplication 512, the attenuation required is two or lower. Furthermore, at a 65 times multiplication 514, or higher, no attenuation is required. Understanding the outlying multipliers N, allows for the system 100 to be designed with substantially less attenuation requirements than expected.

Reduction of the required attenuation of the differential mode harmonics 404 is achieved through two steps. First, the controller 140 uses the phase lock loop 122 to tie the switching rate of the active rectifier 120 to the output frequency of the current 112. As the frequency of the output current 112 varies during operation of the aircraft 10, the switching rate is changed by the phase lock loop 122 to match. Thus, if the output current 112 increases from 360 Hz to 800 Hz, due to an operational change of the aircraft 10, the phase lock loop 122 increase the base switching frequency to 800 Hz. Locking the base switching frequency to the fundamental frequency of the current ensures that the resultant common mode harmonics 402 and differential mode harmonics 404 are predictable.

Second, the controller 140 applies a frequency multiplier N to the switching frequency 124, with the switching rate multiplier N being selected to reduce the attenuation requirements. Particular multipliers N that unexpectedly reduce the attenuation required lower than the trend would indicate include an multipliers N of 15, 21 or 27.

The combination of locking the switching rate to the fundamental frequency and multiplying the switching frequency by the specific multipliers N substantially reduces the attenuation required beyond that which is expected by the trend. In alternative examples, locking the switching rate to the fundamental frequency and multiplying the switching frequency by a multiplier of 65 or higher can remove attenuation requirements entirely. This reduction in the required attenuation carries a substantial weight and cost benefit by reducing the size filters required to achieve the appropriate attenuation.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A power distribution system comprising:
a variable frequency alternating current (AC) generator;
an active rectifier electrically connected to the variable frequency AC generator such that AC power output from the variable frequency AC generator is rectified by the active rectifier; and
a switching controller configured to detect a fundamental frequency of the AC power output and lock an active switch rate of the active rectifier to an integer multiple of the fundamental frequency.

2. The power distribution system of claim 1, wherein the variable frequency AC generator is a gas turbine engine generator.

3. The power distribution system of claim 2, wherein the fundamental frequency is in the range of 360 Hz to 800 Hz.

4. The power distribution system of claim 1, wherein the active switching rate of the active rectifier is one of 15 times the fundamental frequency, 21 times the fundamental frequency, and 27 times the fundamental frequency.

5. The power distribution system of claim 4, wherein the active switching rate of the active rectifier is 21 times the fundamental frequency.

6. The power distribution system of claim 4, wherein the active switching rate of the active rectifier is 15 times the fundamental frequency.

7. The power distribution system of claim 4, wherein the active switching rate of the active rectifier is 27 times the fundamental frequency.

8. The power distribution system of claim 1, wherein the switching controller is a dedicated active rectifier controller.

9. The power distribution system of claim 1, wherein the switching controller is a component of a general purpose aircraft controller.

10. A method for reducing attenuation requirements in an active rectifier comprising:
identifying a fundamental frequency of an alternating current (AC) power received by the active rectifier and setting a switching rate to of the active rectifier to an odd number integer multiple of the fundamental frequency using a controller.

11. The method of claim 10, wherein the switching rate of the active rectifier is one of 15 times the fundamental frequency, 21 times the fundamental frequency, and 27 times the fundamental frequency.

12. The method of claim 11, wherein the switching rate of the active rectifier is 21 times the fundamental frequency.

13. The method of claim 11, wherein the switching rate of the active rectifier is 15 times the fundamental frequency.

14. The method of claim 11, wherein the switching rate of the active rectifier is 27 times the fundamental frequency.

15. The method of claim 10, wherein the AC power is generated by a variable frequency generator and wherein the fundamental frequency of the AC power varies across operation of the variable frequency generator.

16. The method of claim 15, wherein the fundamental frequency of the AC power varies across the range of 360 Hz to 800 Hz.

17. The method of claim 15, wherein the variable frequency generator is a gas turbine engine generator.

18. An aircraft power distribution system comprising:
   a gas turbine engine including a variable frequency generator;
   an active rectifier electrically connected to the variable frequency generator and configured to rectify power received from the variable frequency generator; and
   a switching controller coupled to the active rectifier and configured to set a switching rate of the active rectifier to a whole number integer multiple of a fundamental frequency of the power.

19. The aircraft power distribution system of claim 18, wherein the fundamental frequency of the power varies in the range of 360 Hz to 800 Hz, and wherein the whole number integer is one of 15, 21 and 27.

20. The aircraft power distribution system of claim 18, wherein the fundamental frequency varies across a single operation.

* * * * *